United States Patent [19]

Miller

[11] Patent Number: 4,531,476

[45] Date of Patent: Jul. 30, 1985

[54] APPARATUS FOR CRYOGENIC BRANDING

[76] Inventor: David S. Miller, 720-6th Ave. SE., 105, Minneapolis, Minn. 55414

[21] Appl. No.: 610,135

[22] Filed: May 14, 1984

[51] Int. Cl.³ .............................................. A01K 11/00
[52] U.S. Cl. ........................................................ 119/1
[58] Field of Search .............. 119/1; 62/293; 110/114, 110/112, 128

[56] References Cited

U.S. PATENT DOCUMENTS

| | | | |
|---|---|---|---|
| 1,811,167 | 6/1931 | Anderson et al. | 101/128 |
| 2,152,274 | 3/1939 | Papazian | 101/114 |
| 3,358,648 | 12/1967 | Berens | 119/1 |
| 3,362,381 | 1/1968 | Farrell | 119/1 |
| 3,411,483 | 11/1968 | Canoy | 119/1 |
| 3,485,060 | 12/1969 | Ziegler | 62/293 |
| 3,515,096 | 6/1970 | Hogg | 119/1 |
| 3,568,464 | 3/1971 | Drayson | 62/293 |

OTHER PUBLICATIONS

Lazarus, A. B. and F. P. Rowe, *Freeze-Marking Rodents with a Pressurized Refrigerant.* Mammel Rev., 1975, No. 1, pp. 31–34.

Rood, J. P. and D. W. Nellis., *Freeze Marking Mongooses.,* J. Wildl. Manage., 44(2): 1980.

Primary Examiner—Hugh R. Chamblee
Attorney, Agent, or Firm—Kinney & lange

[57] ABSTRACT

An apparatus utilizing cryogenic material to brand the hide of a live animal. The apparatus includes a cup-shaped applicator having a mechanism for defining an aperture of varying configuration in accordance with a desired brand insignia and a mechanism to retain the cryogenic material and to prevent exposure of the animal hide to the cryogenic material except at the aperture. The orifice perimeter is pressed into contact with the hide of the animal to be marked. The cryogenic material retained by the applicator passes through the aperture and contacts an area of animal hide conforming to the configuration of the aperture. The cryogenic material freezes this area of hide long enough to kill the pigment-producing cells (melanocytes) of the hair. The hair in the exposed area is replaced by a growth of white hair, creating a permanent and discernible brand of desired configuration.

5 Claims, 4 Drawing Figures

APPARATUS FOR CRYOGENIC BRANDING

BACKGROUND OF THE INVENTION

1. Field of the Invention

The present invention relates generally to apparatus utilizing cryogenic material to brand the hide of a live animal.

2. Description of the Prior Art

The branding of animals has traditionally been effected by means of a hot branding iron applied to the hide of an animal to burn off the hair and also burn the skin so as to form scar tissue in which the hair does not grow back. This method of branding was painful to the animal, produced a mild trauma on the skin which is open to infection and is a time consuming and distasteful job for the persons required to do the branding.

A more contemporary approach to branding uses a cryogenic material to kill the pigment producing cells (melanocytes) of the hair. The hair in the exposed area will then grow out white to result in a permanent marking.

Freezing an area of animal hide is accomplished by either supercooling a branding iron to be brought into contact with the animal hide or by applying the cryogenic material directly to the hide of the animal.

Hogg U.S. Pat. No. 3,515,096, granted Mar. 18, 1968, Berens U.S. Pat. No. 3,358,648, granted May 26, 1967, and Drayson U.S. Pat. No. 3,568,464, granted Mar. 10, 1969, are apparatus which utilize cryogenic material to cool a branding iron to a selected subfreezing temperature which is then pressed firmly against the hide of an animal to effect local controlled freezing of an area corresponding to the shape of the branding iron. As described above, there is a subsequent regrowth of white hair in the shape of the brand design.

One disadvantage inherent in these type of apparatus is that the hair of the animal frequently acts as an insulator by preventing adequate contact between branding iron and the hide with inadequate depigmentation of the dark hair follicles resulting. Because of this, it is frequently necessary to shave the hair off the hide of the animal in order for the branding iron to be effective. Another disadvantage is that an unduly long period of time is required for the branding iron to cool to a sufficiently low temperature level, and the iron must also be recooled after each application of the brand. If the branding iron becomes warm before the animal is adequately branded, a second application of the iron may be necessary, which leads to problems to registration between the first and second brands. However, if the branding iron is applied to the animals hide too long, it may cause permanent removal of the hair as well as open sores and/or wounds. A further disadvantage is that a multitude of branding iron heads or insignia are necessary if a unique brand on each animal is desired.

The other method utilizing cryogenic material to brand the hide of an animal is to apply the cryogenic material directly to the hide of the animal. Farrel U.S. Pat. No. 3,362,381, granted Jan. 9, 1968 generally indicates a method for applying a cryogenic material directly to the hide of an animal, but it fails to disclose any apparatus for accomplishing this.

The direct application of a cryogenic gas to the hide of a live animal is disclosed by Canoy U.S. Pat. No. 3,411,483, granted Dec. 19, 1966. Because gaseous cryogenic material frequently cannot be cooled sufficiently to properly freeze the hide of an animal, many times depigmentation of the dark hair follicles does not occur.

Ziegler U.S. Pat. No. 3,485,060, granted May 16, 1968 utilizes a liquid cryogenic material to cool a branding tool containing closely spaced highly conductive fingers which directly contact the animal hide. The Ziegler branding iron is not as restricted by the insulating quality of hair on an animal hide as other prior art branding irons. However, the freezing of the hide may only be effected at points on the hide resulting in a "spotty" regrowth of white hair, which is difficult to read.

Although Ziegler further discloses open ducts through the fingers on an alternative embodiment, the ducts only provide a vent for the expanding gases from the vaporizing liquid refrigerant. This escaping gas has the same drawbacks as the Canoy patent and may expose areas of hide not intended to be freeze-branded as it escapes through the finger ducts.

SUMMARY OF THE INVENTION

The present invention is an apparatus for branding a live animal by directly applying cryogenic material to the hide. The apparatus includes a cup-shaped applicator having a mechanism for defining an orifice or aperture of varying configuration in accordance with a desired insignia and a mechanism for retaining cryogenic material and preventing exposure of an animal hide to the cryogenic material, except through the aperture. The orifice perimeter is pressed into contact with the hide of an animal to be marked. Cryogenic material retained by the applicator passes through the aperture and contacts an area of the animal hide conforming to the configuration of the aperture. The cryogenic material freezes this area of hide long enough to kill the pigment producing cells of the hair. The hair in the exposed area is replaced by a growth of white hair, creating a permanent brand of desired configuration.

DETAILED DESCRIPTION OF THE PREFERRED EMBODIMENTS

Figure 1:
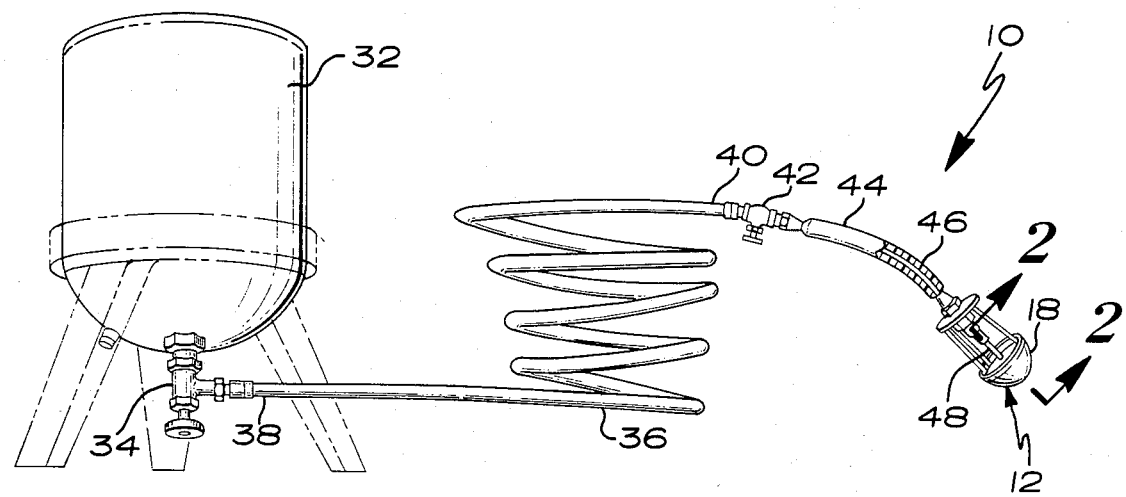
FIG. 1 is a perspective view of the applicator connected by a flexible heat insulated tubing to a source of cryogenic material.
Figure 2:
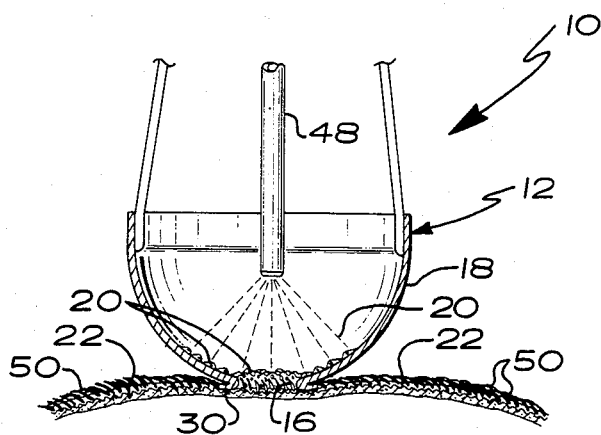
FIG. 2 is a sectional view of the applicator, taken along the line 2—2 in FIG. 1.
Figure 3:
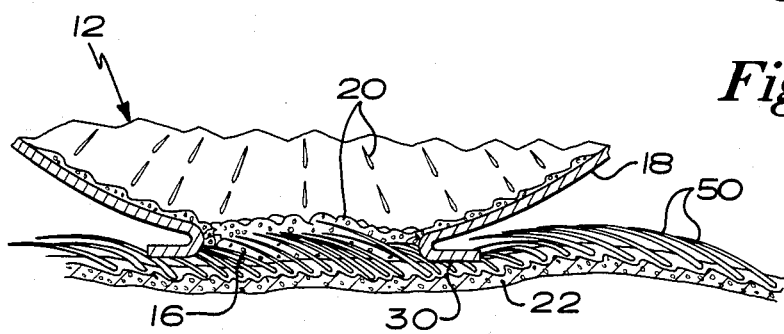
FIG. 3 is a sectional view of the applicator showing the first end of the applicator pressed against the hide of an animal while cryogenic material is passed into the applicator.

An apparatus for branding a live animal by directly applying cryogenic material to the hide is generally indicated at 10 in FIGS. 1 and 2. A preferred structure of the apparatus is shown in FIGS. 2 and 3, which includes a cup-shaped applicator 12 having an aperture 16 therethrough and defining a body 18 for retaining a cryogenic material 20 and for preventing exposure of an animal hide 22 to cryogenic material 20 except through aperture 16. A preferred cryogenic material 20 exhibiting desired properties is Cryokwik manufactured by Damon/EIC.

Figure 4:
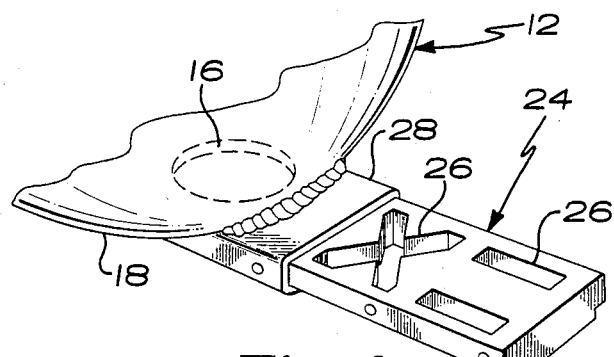
FIG. 4 is a perspective view of a portion of the applicator showing an insignia bar attached by a guide track mechanism to the first end of the applicator, masking the aperture.

In a preferred embodiment, as shown in FIG. 4, aperture 16 of applicator 12 is masked by an insignia bar 24, containing a plurality of apertures 26 of varying design, adjustably secured by a guide track 28 to applicator 12 such that each aperture 26 can be aligned with and over aperture 16. Guide track 28 is preferably designed so that a variety of insignia bars 24 may be readily inserted or removed from guide track 28. In another preferred embodiment, a seal may be disposed between the perimeter of aperture 16 and guide track 28 and insignia bar 24 such that cryogenic material 20 can pass through aperture 16 and aperture 26, but cannot escape through any gap between the surfaces of applicator 12, guide track 28 and insignia bar 26.

As shown by FIG. 3, applicator 12 is firmly pressed against hide 22 of an animal to be branded. When cryogenic material 20, preferably in solid form, is passed into applicator 12, the warmer atmospheric air causes cryogenic material 20 to begin to liquify. This combination of liquid and solid cryogenic slush 20 flows to and through aperture 16 where it comes into contact with hide 22 by penetrating through the hair 50. A seal 30, designed to form a seal between the perimeter of aperture 16 and hide 22, may be utilized to prevent exposure of areas of hide 22 not intended to be frozen by cryogenic material 20.

Although cryogenic material 20 can be passed into applicator 12 by various portable pressurized canister mechanisms, a preferred arrangement of connecting applicator 12 to a cryogenic material source 32 is shown in FIG. 1. The flow of cryogenic material 20 from source 32 can be regulated by a valve 34, valve 34 being connected to a first end 38 of a flexible, heat-insulated tubing 36. A second end 40 of tubing 36 is connected to a valve 42 which regulates the flow of cryogenic material 20 through a handle 44 of applicator 12. Handle 44 is in turn connected to a spout 48. Cryogenic material 20 flows through handle 44 and out spout 48 into applicator 12. The source or canister 32 is shown inverted as it is desired to minimize the amount of gas drawn off and to maximize the amount of non-gaseous cryogenic material 20 for application to the animal hide 22. Handle 44 is insulated as shown at 46 of FIG. 1 to protect the operator from the cooling effect of cryogenic material 20 flowing through handle 44.

Although the present invention has been described with preference to the preferred embodiments, a person skilled in the art will recognize that changes may be made in the form and detail without the departing from the spirit and scope of the present invention.

I claim:

1. An apparatus utilizing cryogenic material to brand the hide of a live animal, comprising:
    cup-shaped applicator means having an end open to the atmosphere for receiving liquid or solid cryogenic material, having means for defining an aperture of varying configuration in accordance with a desired insignia, and having means extending away from the aperture for retaining the liquid or solid cryogenic material and for preventing exposure of the animal hide to the liquid or solid cryogenic material except at the aperture.

2. The apparatus of claim 1 further comprising means for forming a seal between the perimeter of the aperture and the hide of an animal when the applicator means is pressed into contact with the animal hide.

3. The apparatus of claim 1 wherein the means for defining an aperture of varying configuration comprises an orifice through the applicator means and an insignia bar containing a plurality of apertures of varying design and guide track means adjustably securing the insignia bar to the applicator means such that each aperture in the insignia bar can be individually aligned with and over the orifice.

4. The apparatus of claim 3 wherein the guide track means is constructed to accept alternate insignia bars within the guide track means.

5. The apparatus of claim 3 further comprising means for forming a seal between the perimeter of the applicator means orifice, the guide track means and the insignia bar aperture aligned therewith such that liquid or solid cryogenic material can pass through the applicator means orifice and insignia bar aperture, but cannot escape through any gap therebetween.

* * * * *